(12) United States Patent
Zhou et al.

(10) Patent No.: US 8,077,257 B2
(45) Date of Patent: Dec. 13, 2011

(54) DETECTION OF PROGRESSIVE PULLDOWN IN A VIDEO SEQUENCE

(75) Inventors: Zhi Zhou, Corona, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1209 days.

(21) Appl. No.: 11/766,705

(22) Filed: Jun. 21, 2007

(65) Prior Publication Data

US 2008/0316356 A1    Dec. 25, 2008

(51) Int. Cl.
*H04N 7/01* (2006.01)
*H04N 5/46* (2006.01)

(52) U.S. Cl. ........................... 348/441; 348/556

(58) Field of Classification Search ............... None
See application file for complete search history.

(56) References Cited

U.S. PATENT DOCUMENTS

| 5,317,398 A | * | 5/1994 | Casavant et al. | 348/570 |
| 2004/0114048 A1 | * | 6/2004 | Jung et al. | 348/441 |

* cited by examiner

*Primary Examiner* — Jefferey Harold
*Assistant Examiner* — Michael Teitelbaum

(57) ABSTRACT

System and methods for the detection of progressive pulldown in a video sequence are provided. The method comprises calculating a difference between temporally adjacent frames in the video sequence, generating a pattern based upon these differences, and comparing the generated pattern against patterns understood for known progressive film modes in order to determine if the video sequence comprises a known progressive film mode. In one embodiment, the pattern may be adjusted to account for uncertainty in assigning values to the pattern, reducing the likelihood of false detections. In another advantage, confidence metrics are built into the method in order to further reduce the incidence of false detections.

20 Claims, 6 Drawing Sheets

DETECTION OF PROGRESSIVE PULLDOWN IN A VIDEO SEQUENCE

BACKGROUND OF THE INVENTION

1. Field of the Invention

The present disclosure relates generally to methods of detecting the film mode of a video sequence and, in particular, to discrimination between progressive and non-progressive (or video) film modes in a video sequence.

2. Description of the Related Art

Multimedia processing systems, such as video encoders, may encode multimedia data using encoding methods based on international standards such as MPEG-x and H.26x standards. Such encoding methods generally are directed to compressing the multimedia data for transmission and/or storage and may combine both progressive and interlaced (non-progressive) sequences. Compression is broadly the process of removing redundancy from the data. In addition, video display systems may transcode or transform multimedia data for various purposes such as, for example, to ensure compatibility with display standards such as NTSC, HDTV, or PAL, to increase frame rate in order to reduce perceived motion blur, and to achieve smooth motion portrayal of content with a frame rate that differs from that of the display device. These transcoding methods may perform similar functions as the encoding methods for performing frame rate conversion, de-interlacing, etc.

A video signal may be described in terms of a sequence of pictures, which include frames (an entire picture), or fields (e.g., an interlaced video stream comprises fields of alternating odd or even lines of a picture). A frame may be generally used to refer to a picture, a frame or a field. Multimedia processors, such as video encoders, may encode a frame by partitioning it into blocks or "macroblocks" of, for example, 16×16 pixels. The encoder may further partition each macroblock into subblocks. Each subblock may further comprise additional subblocks. For example, subblocks of a macroblock may include 16×8 and 8×16 subblocks. Subblocks of the 8×16 subblocks may include 8×8 subblocks, and so forth. Depending on context, a block may refer to either a macroblock or a subblock, or even a single pixel.

Video sequences may be received by a receiving device in a compressed format and subsequently decompressed by a decoder in the receiving device. Video sequences may also be received in an uncompressed state. In either case, the video sequence is characterized at least by a frame rate, and a horizontal and vertical pixel resolution. Many times, a display device associated with the receiving device may require a different frame rate, and/or pixel resolution, and video reconstruction of one or more video frames may be performed. Reconstruction of video frames may comprise estimating a video frame between two or more already received (or received and decompressed) video frames. Furthermore, decoder devices may create new video data based on already reconstructed video data.

Frame rate conversion by pulldown is one example of new video data creation. Pulldown comprises repeating source frames in a known pattern to generate an output video signal which possesses more frames than the original. For example, when film is transferred to video, 24 frames per second of film must be converted to 60 fields per second of video by "stretching" four frames of film to fill five frames of video. For in an NTSC frame, there are actually two complete fields, for each frame displayed, resulting in ten fields for every four film frames. In 3:2 pulldown, for example, one film frame is placed across three fields, the next across two, the next across three, and so on. The cycle repeats itself completely after four film frames have been exposed. In interlaced (non-progressive) pulldown, the two fields comprise the even and odd interlaced fields, while in progressive pulldown, the two fields comprise the complete frame.

In order to display a high quality progressive image from a video stream, the decoder needs to figure out which fields in the video stream go together to make each film frame. However, the video stream may contain frames generated by progressive and interlaced pulldown. As a result, the decoder may combine together two fields that weren't meant to go together, creating distortion in the image which is displayed.

From the forgoing, then, there is a need for systems and methods of detecting the pulldown in a video stream.

SUMMARY OF CERTAIN INVENTIVE ASPECTS

The systems and methods of the embodiments of the present disclosure each have several aspects, no single one of which is solely responsible for its desirable attributes. Without limiting the scope of this disclosure as expressed by the claims which follow, its more prominent features will now be discussed briefly. After considering this discussion, and particularly after reading the section entitled "Detailed Description of Certain Inventive Embodiments" one will understand how the sample features of this disclosure provide advantages that include detection of progressive film modes from a video sequence of unknown film mode.

In an embodiment, the present disclosure provides a method of detecting a film mode of a video sequence. The method comprises computing a difference, $d(t)$, between a selected frame, $F(t)$, and a temporally adjacent frame, $F(t-1)$, where t is time, over a selected range of times. The method further comprises calculating a difference threshold, $T(t)$, for each $d(t)$ as the average of the maximum and minimum values of $d(t-1)$, $d(t)$, and $d(t+1)$ over the selected range of times. The method additionally comprises generating a pattern by assigning a pattern value, $e(t)$, to each $d(t)$, where a first pattern value is generated when $d(t)$ is greater than $T(t)$ and a second pattern value different than the first is generated when $d(t)$ is less than $T(t)$. The method also comprises determining the selected frames, $F(t)$, over the selected range of times, to be either a part of a known progressive film mode or video based upon a comparison of the generated pattern to patterns of a plurality of known progressive film modes.

In another embodiment, the present disclosure provides a method of detecting a film mode of a plurality of frames of a video sequence. The method comprises computing a difference, $d(t)$, between a selected frame, $F(t)$, and a temporally adjacent frame, $F(t-1)$, where t is time, over a selected range of times. The method also comprises generating a pattern value, $e(t)$, for each frame, comprising a first pattern value and a second pattern value, different than the first, using the measured differences. The method additionally comprises adjusting one or more of the pattern values to a third value, different than the first and second pattern values, if either the frame $F(t-1)$ has been determined to be part of a known progressive film mode and the generated pattern values, $e(t)$, for any t within the selected range differ from an expected pattern value, $x(t)$, determined from the known progressive film mode or the standard deviation and mean of $d(t)$ over the selected time range, are less than a threshold standard deviation, $T_s$, and a threshold mean, $T_m$, respectively. If $F(t-1)$ is not detected to be part of a known progressive film mode, the film mode of $F(t)$ is determined to be a progressive film mode if each pattern value in the generated pattern follows the pattern of the known progressive film mode. If $F(t-1)$ is detected to be part of a known progressive film mode, the film mode of F(t) is determined to be the known progressive film mode if each e(t) in the generated pattern not equal to the third pattern value follows the pattern of the known progressive film mode.

In a further embodiment, the present disclosure provides an apparatus for detecting progressive video sequences from a video sequence of unknown film mode. The apparatus comprises a first component which computes a difference, d(t), between a selected frame, F(t), and a temporally adjacent frame, F(t−1), where t is time, over a selected range of times. The apparatus further comprises a second component which calculates a difference threshold, T(t), for each d(t) as the average of the maximum and minimum values of d(t−1), d(t), and d(t+1) and generates a pattern value, e(t), for each d(t), where a first pattern value is generated when d(t) is greater than T(t) and a second pattern value different than the first is generated when d(t) is less than T(t). The apparatus additionally comprises a third component which determines that the selected frames, F(t), over the selected range of times, to be either part of a selected progressive film mode or video based upon a comparison of the generated pattern to patterns of a plurality of known progressive film modes.

DETAILED DESCRIPTION OF CERTAIN INVENTIVE EMBODIMENTS

Embodiments of the present disclosure provide systems and methods for the detection of progressive pulldown in video sequences. In certain embodiments, the method comprises generating a pattern based upon differences between temporally adjacent frames of the video sequence and comparing the generated pattern against patterns of known progressive film modes in order to identify sequences using progressive pulldown. Frames which are part of a pattern which matches one of a plurality of selected, known progressive film modes are determined to be part of the known progressive film mode. Frames which are not matched to any of a plurality of selected, known film modes are designated as non-progressive video.

Advantageously, these methods may be used to identify regions of progressive and non-progressive pulldown to improve the quality of displayed video sequences. Frames detected to belong to a known progressive film mode may be passed along unchanged for display, while frames detected to be video are further processed to recover their source film signal. Progressive pulldown may be performed on this recovered source film signal in order to provide a progressive video sequence in place of the previously detected non-progressive frames. This allows a video sequence originally provided as a mixture of progressive and non-progressive pulldown frames to be displayed as substantially all progressive pulldown frames, enhancing the quality of the video displayed.

Advantageously, the systems and methods disclosed below further include algorithms for avoiding false detection of progressive film modes. In one example, the generated pattern may be adjusted under certain conditions to better represent ambiguities in generating the patterns. In another example, the criteria which govern the comparison of known and generated patterns can be tightened when previous frames are not detected as a progressive film mode and loosened when previous frames are detected as a progressive film mode. This reflects an expectation that the current frame is expected to be of the same mode as the previous frame. In this manner, a high threshold is set for the detection of progressive film frames but, once frames are determined to be progressive, ambiguities in pattern detection are unlikely to result in false detection of progressive film modes. These and other advantages of the present disclosure are discussed in detail below.

Figure 1:
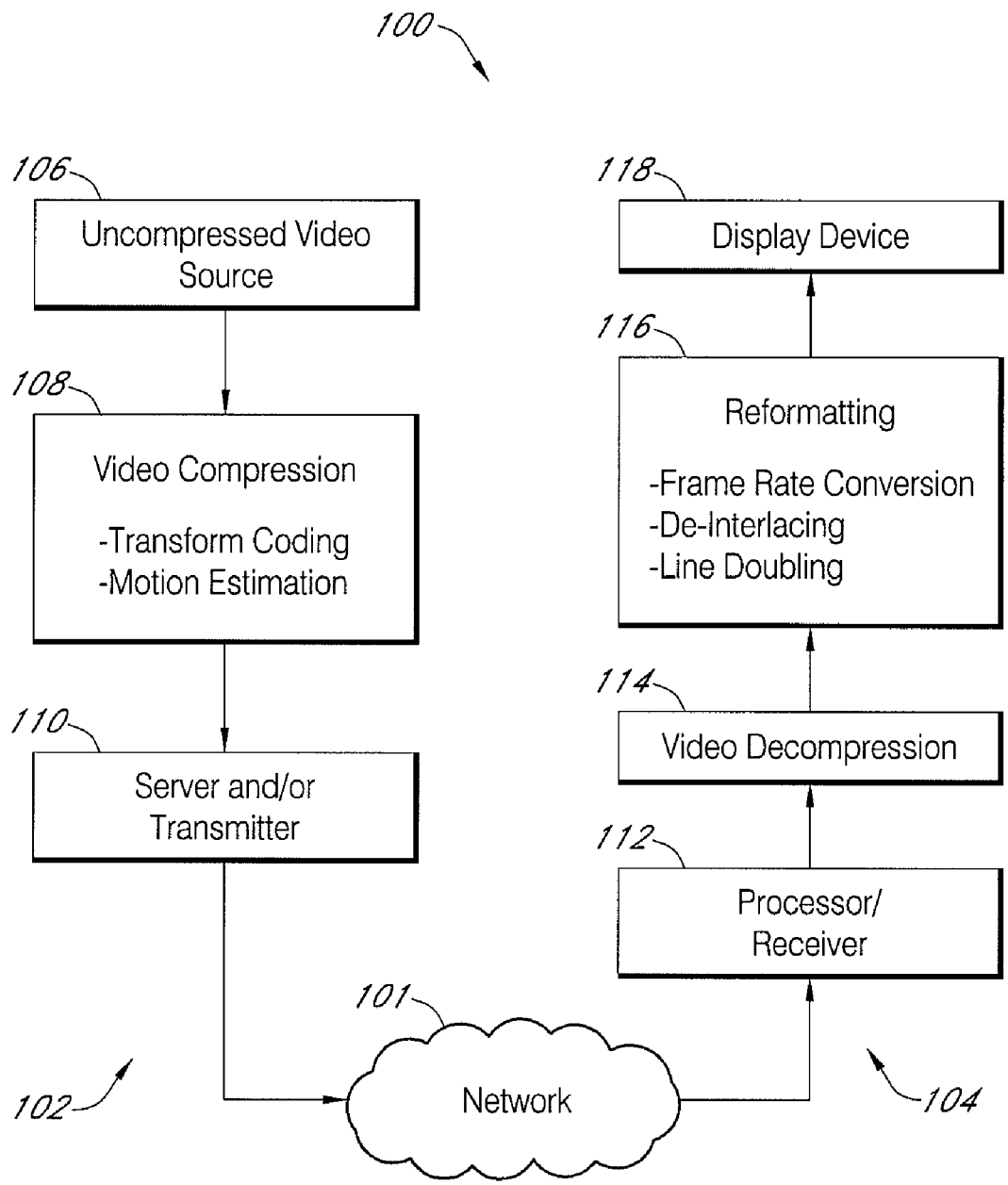
FIG. 1 is a functional block diagram of an exemplary video system for encoding and decoding of compressed digital video data, according to one embodiment of the system and method.

FIG. 1 illustrates a functional block diagram of an exemplary video system 100. The system 100 includes a video source 102 and video reception device 104. In this embodiment, the video source 102 obtains raw (uncompressed) video from an uncompressed video source 106, compresses it with a video compression element 108 and stores or communicates the compressed video data using a communication element 110. The video reception device 104 includes a processor and/or receiver 112, a video decompression element 114, and a reformatting subsystem 116. The compressed video can be communicated from the video source 102 to the video reception device 104 via a network 101.

The uncompressed video source 106 can be a video camera, or a memory device such as a disk drive. The uncompressed video source 106 provides uncompressed video data in the form of luminance and chrominance, or in individual color intensities such as red, green, and blue, etc.

The video compression element 108 performs any of various video encoding techniques to remove the redundancy from the uncompressed video data. Transform coding may be used to remove higher spatial frequency components thereby removing spatial redundancy within a frame. Most video compression schemes involve a form of motion estimation such as block matching/motion compensated prediction or optical flow as well as others. The purpose of the motion estimation schemes is to remove the temporal redundancy between frames in a video sequence. Other forms of video compression known to skilled technologists may also be used in the video compression element 108.

The communication element 110 may be a server that is connected to the Internet and stores the compressed video. The communication element 110 may also be a transmitter that is configured to transmit the compressed video over the network 101. The network 101 may comprise one or more of a wireline or wireless communication system, including one or more of a Ethernet, telephone (e.g., POTS), cable, powerline, fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA)

system, a high data rate (1×EV–DO or 1×EV–DO Gold Multicast) system, an IEEE 802.11 system, a DMB (Digital Multimedia Broadcasting) system, an orthogonal frequency division multiple access (OFDM) system, or a DVB-H (Digital Video Broadcasting-Handheld) system.

The processor/receiver 112 of the video reception device 104 receives the compressed video over the network 101. In another embodiment, the processor/receiver accesses the compressed video from a memory storage device such as a DVD, a hard drive, a memory card, etc. The processor/receiver 112 can be included in a personal computer, a set top box, a handheld device, etc.

The video decompression element 114 decodes (e.g., decompresses) the received compressed video data. The video decompression element 114 reconstructs the video frames that were compressed in the encoding process. Reconstruction can include inverse transformation of transformed coefficients (e.g., discrete cosine transform (DCT), wavelet transform, etc.), reconstruction of spatially predicted data, and reconstruction of temporally predicted data. The video decompression element 114 can be part of the same device that contains the processor/receiver 112, or it can be a separate device. The video reception device 104 can be part of a set-top box, a DVD player, a PC, etc. In some embodiments, the video reception device 104 may receive uncompressed video (e.g., from the uncompressed video source 106). In these embodiments, the video decompression element 114 may be omitted.

The format of the reconstructed video output from the video decompression element 114 depends on the format that was encoded by the video encoder. For example, digital video formats can include different frame rates, different numbers of lines and rows of pixels, interlaced and non-interlaced, etc. For example, DVD's are typically encoded with 24 fps (frames per second) format, NTSC is 30 frames per second, and PAL is 25 frames per second. The format may be interlaced or progressive. The reformatting subsystem 116 modifies the video signal to a format that fits the format of a display device 118 that is connected to the video reception device 104. The display device may be a television set (e.g., NTSC, PAL or HDTV), or a computer monitor running at frame rates such as 70 Hz, 75 Hz, 80 Hz, etc. The reformatting subsystem 116 may be part of the same device as the video decompression element 114 and/or the processor/receiver 112. In some embodiments as discussed above, the video received by the video reception device 104 may be uncompressed video (e.g., from the uncompressed video source 106) and the video decompression element 114 is omitted. In these embodiments, the reformatting subsystem 116 reformats the uncompressed video.

The processes performed by the reformatting subsystem 116 can be very similar to the encoding schemes used to encode the compressed video data. Motion estimation/compensation can be used to create intermediate frames between reconstructed frames in order to enable frame rate conversion, such as pulldown. Therefore, methods of spatial prediction and temporal prediction used in encoder devices can also be used in decoder devices for purposes of reformatting the video. The reformatting subsystem 116 can use reconstructed video data and/or compressed video data (e.g., motion vectors, residual error values, etc.) for performing the reformatting.

Figure 2:
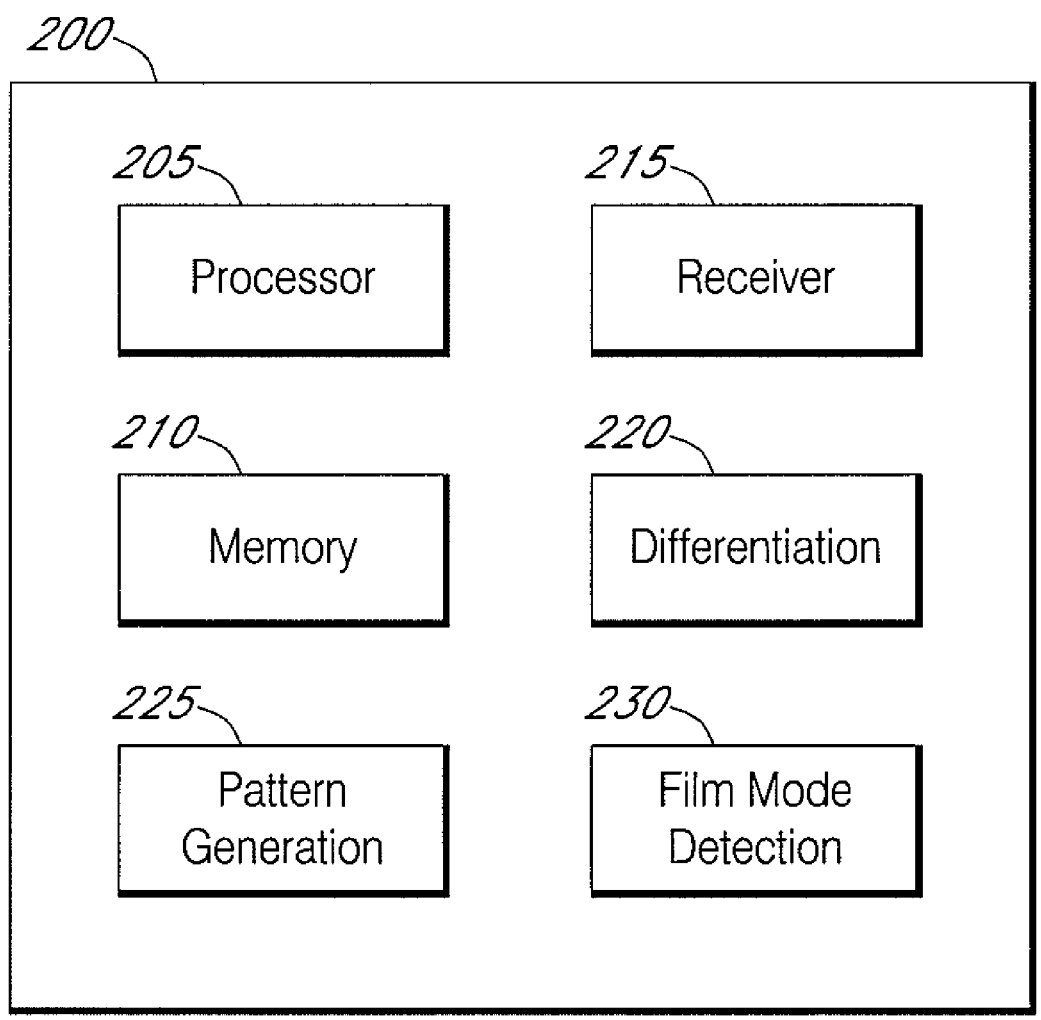
FIG. 2 is a block diagram illustrating an embodiment of a pulldown detection system 200 that may be used as at least part of a reformatting subsystem of a video system such as illustrated in FIG. 1.

FIG. 2 is a block diagram illustrating an embodiment of a pulldown detection system 200 that may be used as at least part of a reformatting subsystem of a video system such as illustrated in FIG. 1. In this embodiment, the pulldown detection system 200 comprises a processor component 205, a memory component 210, a receiver component 215, a differentiation component 220, a pattern generation component 225, and a film mode detection component 230. In certain embodiments, the processor and receiver components 205, 215 perform the processing/receiving functions of the processor/receiver 112 of FIG. 1. In alternative embodiments, the processor and receiver components 205, 215 do not perform the processing/receiving functions of the processor/receiver 112 of FIG. 1 and instead only perform processing/receiving functions for the pulldown detection system 200. The processor 205 may include one or more of a general purpose processor and/or a digital signal processor and/or an application specific hardware processor. The memory 210 may include, for example, one or more of integrated circuits, disk based storage, or any readable and writeable random access memory device. The processor 205 is coupled to the memory 210 and the other elements to perform the various actions of the other elements. The receiver 215 receives video data over the network 101. In other embodiments, the receiver 215 may be omitted and the video data may be retrieved from the memory element 210 or one or more external memory devices including memory discs, memory cards, internet server memory, etc. The video data received over the network 101 or retrieved from the memory element 210 or from external memory devices may be compressed or uncompressed video data. In the case of compressed video data stored in the memory element 210 or in the external memory devices, the compressed video data may have been created at an earlier time by an encoding device such as the video source 102 in FIG. 1.

In one embodiment, the differentiation component 220 computes the difference between temporally adjacent frames. In one example, the difference may be calculated between a current frame F(t) and a temporally adjacent frame F(t−1), immediately preceding F(t), where t is time, for a selected range of t. The result of the difference computation, d(t) is subsequently stored in the memory 210 and assembled in order of time to form a measured pattern of the video signal, $D_t$, given by:

$$D_t = [d(t-n+1), d(t-n+2), \ldots d(t)].$$

where n is an integer.

This pattern, $D_t$, may be subsequently accessed by the pattern generation component 225, as discussed in greater detail below, for creation of a pattern based upon the difference measurement.

In one embodiment, the difference is computed on the basis of intensity. However, other properties of the frames, as understood by one of ordinary skill in the art, may be used to compute the difference without departing from the spirit of the invention.

The difference calculation may also be performed using a variety of methods as understood by those of skill in the art. In one example, the difference measurement is computed using the sum of absolute differences (SAD) between F(t) and F(t−1). In another example, frames F(t) and F(t−1) are sub-sampled and the SAD is calculated between the sub-sampled frames.

The pattern detection component 225 utilizes the difference values computed by the differentiation component 220 in order to generate a pattern for each frame F(t) based upon the difference values d(t). In general, for each difference d(t), the pattern detection component 225 determines a threshold T(t) which is then compared to the difference. When the d(t) is greater than T(t), the difference is assigned a first pattern value, while when d(t) is less than T(t), the difference is assigned a second pattern value, which is different from the first. These pattern values, et, are subsequently assembled into a pattern, $E_t$, given by:

$$E_t = [e(t-n+1), e(t-n+2), \ldots e(t)]$$

Figure 4A:
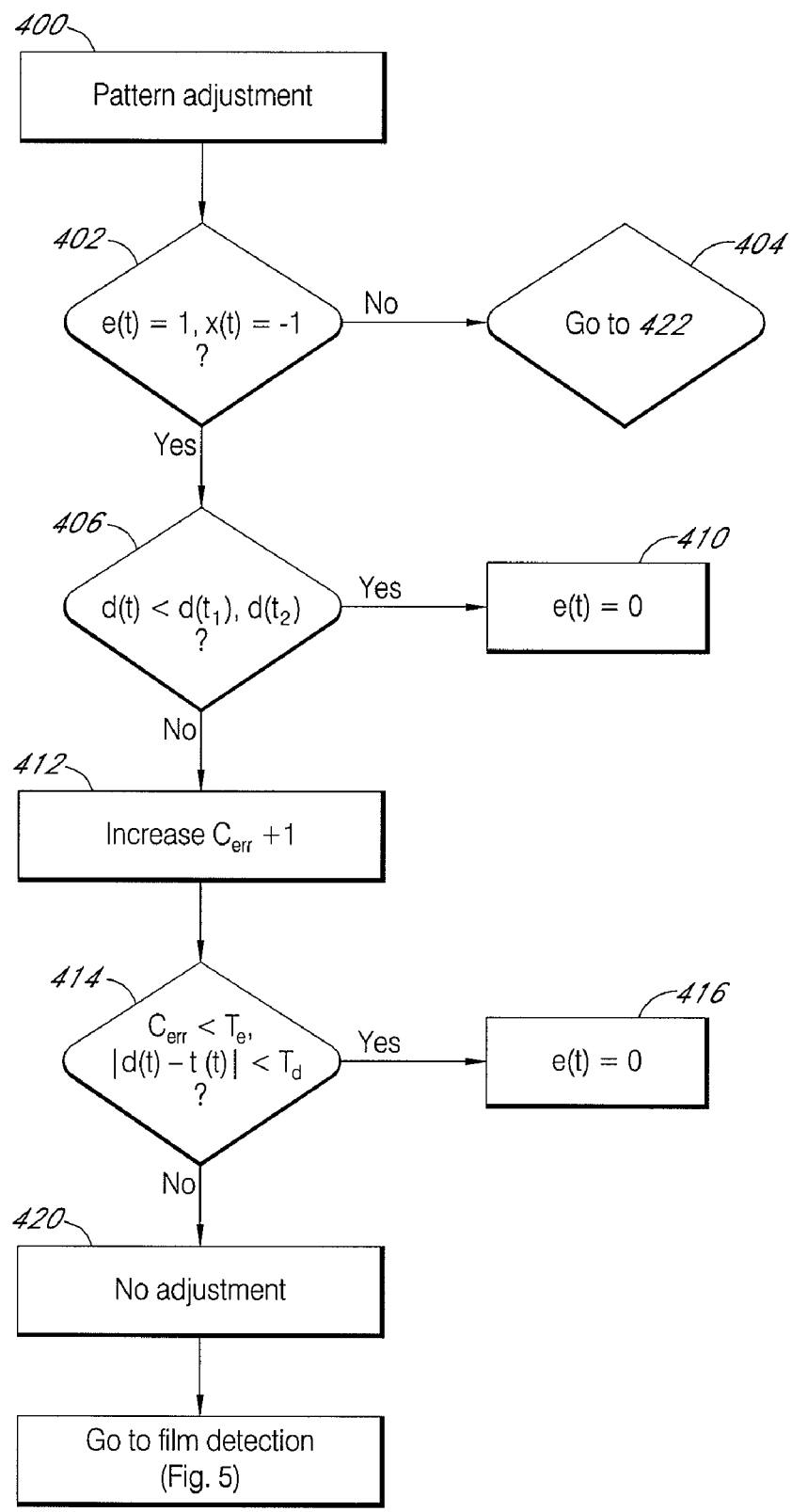
FIGS. 4A-4B illustrate embodiments of a method of pattern adjustment to a pattern determined from a progressive video sequence.

As discussed in greater detail below with respect to FIGS. 4A-4B, this pattern may be subsequently adjusted in order to avoid false detection of progressive film modes.

The film mode detection component 230 employs the output of the pattern generation component 225 for use in identifying the film mode of the video sequence. In one embodiment, the patterns associated with known progressive film modes are compared with the generated pattern to provide a preliminary determination as to whether the frame is progressive pulldown sequence or not. If the generated pattern matches a known pattern, the frames are designated as part of a progressive pulldown sequence, generically referred to as "film" herein. Otherwise, the frame is identified as "video", a generic term for any video sequence not identified as progressive pulldown.

As discussed in greater detail below, the manner in which the comparison is performed may be varied between a strict comparison and a less strict comparison, with the strict comparison used for frames which do not follow immediately after a frame determined to be part of a progressive pulldown sequence, and the loose comparison used for frames which follow a frame determined to be part of a progressive pulldown sequence. This result is subsequently put through a final decision process which includes a reliability check before the final decision is made. Failure to pass the reliability check will cause a frame not to be detected as part of a progressive pulldown sequence, even if the comparison designated the frame as part of a progressive pulldown sequence in the preliminary determination.

It may be understood that, in some embodiments, one or more of the elements of the pulldown detection system 200 of FIG. 2 may be rearranged and/or combined. The elements may be implemented by hardware, software, firmware, middleware, microcode, or any combination thereof.

Figure 3:
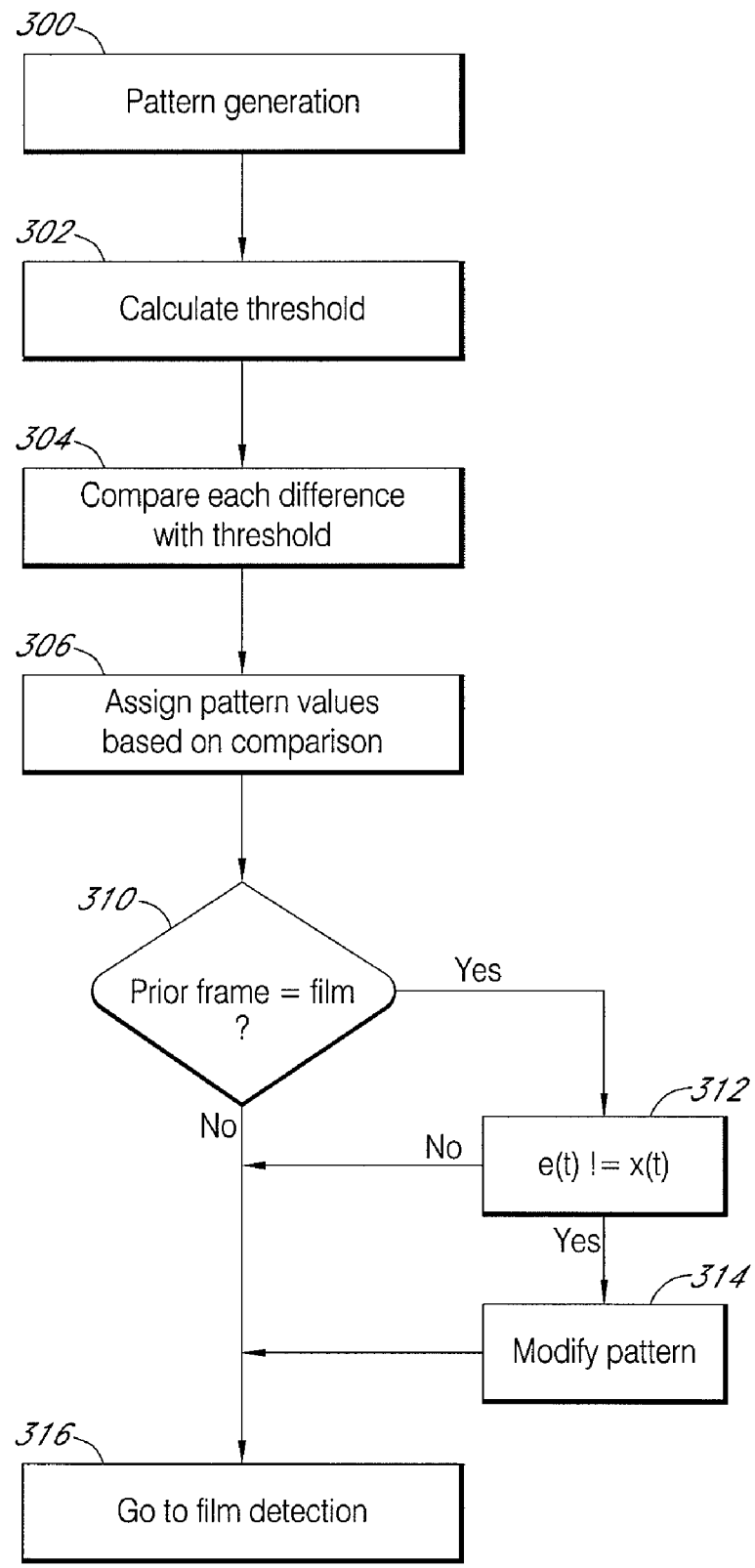
FIG. 3 illustrates one embodiment of a method of pattern detection in a progressive video sequence.

FIG. 3 presents a schematic illustration of one embodiment of a method of pattern generation 300 for a video sequence. The method utilizes the difference values d(t) calculated by the difference measurement component to calculate a pattern value for each difference. As discussed in greater detail below, the method 300 may further adjust the generated pattern based upon an expected pattern value when the frame prior to the current frame is determined to be part of a known progressive pulldown sequence, reducing discrepancies between the measured and expected values. This adjustment reflects the principle that, since the determination of a frame as part of a known progressive pulldown sequence requires a strict scrutiny, once a selected frame has been determine to be part of a known progressive pulldown sequence, there is a bias in the decision making process towards determining that the next frame will also be part of a known progressive pulldown sequence.

The method 300 begins at Step 302 with the calculation of a threshold T(t) for a difference value d(t). The threshold is determined by finding the maximum and minimum values of d(t), d(t−1), and d(t+1), where d(t−1) and d(t+1) are the difference values immediately before and immediately after d(t) in time. Denoting the maximum and minimum difference values as u(t) and b(t), respectively, the threshold is calculated as the average of u(t) and b(t):

$$T(t) = (u(t) + b(t))/2$$

Advantageously, in this manner, the threshold is calculated for each d(t), rather than using a single threshold for every difference. In this manner, the threshold is more appropriately tailored to each difference value, reducing the likelihood that an erroneous pattern value is assigned to the difference value d(t).

It may be understood, however, that this average represents only one possible way of calculating the threshold and that other threshold calculating algorithms may be utilized without departing from the spirit of the invention. In one example, a weighted average of u(t) and b(t) may be utilized. Alternatively, the threshold may be calculated using an average of the selected difference and the maximum and minimum difference values for the two difference values immediately before and immediately after the selected difference.

In steps 304 and 306, the difference value d(t) is compared to the threshold T(t) to obtain a pattern value e(t). In one embodiment, a first pattern value, 1, is assigned when d(t) is greater than T(t) and a second pattern value, −1, is assigned when d(t) is less than T(t). In this manner, the pattern $E_t = [e(t-n+1), e(t-n+2), \ldots e(t)]$ is generated for each d(t) over the selected time range.

In Steps 310 and 312, the pattern generation method 300 determines whether to adjust the values of the generated pattern in Step 314 or pass the pattern, unadjusted, to the film detection component in Step 316. In one embodiment, the adjustment may performed if the frame F(t−1) prior to a selected frame F(t) has been determined to be part of a known progressive pulldown sequence and e(t) is not equal to an expected value, x(t), as described in greater detail below.

For example, the pattern generation component may query the film mode detection component to make this determination. Alternatively, the memory component may be queried to make this determination. If the frame F(t−1) has been determined to be part of a known progressive pulldown sequence, then the generated pattern is passed unchanged to the film detection component. If the frame F(t−1) has not been determined to be part of a known progressive pulldown sequence, however, the pattern is subsequently processed by a pattern modification algorithm of the pattern detection component. In alternative embodiments, the pattern generation algorithm may be housed in a component separate from the pattern generation component.

The pattern values e(t) may be adjusted in the case that the prior frame is determined to be part of a known progressive pulldown sequence by the pattern adjustment algorithm. In general, an expected pattern of the current frame, based upon the previously detected progressive pulldown sequence position, X(t), is given by $$X(t) = [x(t-n+1), x(t-n+2), \ldots x(t)]$$

e(t) is compared to x(t) to determine if there are discrepancies between the generated and expected pattern values. If there is no discrepancy, then the generated pattern values are unchanged. If a discrepancy is determined, however, the pattern is adjusted. The pattern adjustment method 400 is discussed in detail below. After pattern adjustment, the adjusted pattern is passed to the film detection component in Step 316.

In Step 402, the pattern adjustment method 400 checks the nature of the discrepancy by determining if e(t)=1 and x(t)=−1. If the answer is no, the method 400 moves to Step 422, as described below. If the answer is yes, the method 400 proceeds to Step 406.

In step 406, the method of pattern adjustment 400 searches for each e(t) in the pattern which differs from the expected value x(t). Upon finding e(t) not equal to x(t), the method 400 searches for $t_1$ which provides the expected pattern value, "1"

in this example, which is closest to the measured pattern value on x(t)'s right hand side. The method 400 further searches for $t_2$ which provides the expected pattern value, "1", which is closest to the measured pattern value on x(t)'s left hand side. If d(t) is less than both $d(t_1)$ and $d(t_2)$, then it is determined that there is a false detection of e(t) and the pattern value e(t) is adjusted to 0 in Step 410, rather than being adjusted to be equal to x(t). This determination reflects that when d(t) is very close to T(t), the value of e(t) is not reliable because small disturbances in the video image can make the d(t) value fluctuate around T(t). Otherwise, an error counter, $C_{err}$, is increased by 1 in Step 412 while maintaining the pattern value unchanged. This error counting reflects that there is a known discrepancy between the expected and generated patterns. Advantageously, these errors may be further used to establish confidence in the generated pattern values, as discussed below.

The error counting may be used to discriminate between different types of pattern value errors. In some cases, discrepancies in the generated and expected patterns may occur because of actual differences in the two patterns. In some cases, discrepancies may be measured where none actually exists. For example, there is a finite error associated with any property measurement of the frame, such as intensity. Therefore, it is possible that the wrong pattern value may be assigned in the pattern generation method of FIG. 3 because the difference between the threshold and the measured difference is less than the error in the measurement of the difference values itself.

To reflect this possibility, two criteria are applied in Step 414 to determine whether the selected e(t) should be adjusted to 0 after all. If both criteria are satisfied, then the pattern adjustment method 400 assigns e(t)=0 in Step 416. If one or more of the criteria are not satisfied, then no adjustment is made and the method proceeds to the film detection method of FIG. 5.

The first selection criteria is that $C_{err}$ is less than a selected error threshold value $T_e$. This criterion reflects that less than the threshold number of errors has been determined in the generated pattern for the frame F(t) and, thus, there is a substantial likelihood that the e(t) should equal the pattern value.

The second selection criteria is that d(t) is very close to the threshold value T(t). This criterion is reflected in the relationship:

$$|d(t)-T(t)|<T_d$$

where $T_d$ is a selected threshold value. This criterion reflects that error in the difference measurement may result in the generation of an incorrect pattern value when the difference between d(t) and T(t) is small.

If the two criteria are not satisfied, then the pattern adjustment method 400 determines that no adjustment is required (Step 420) and the pattern is passed to the film detection method.

Figure 4B:
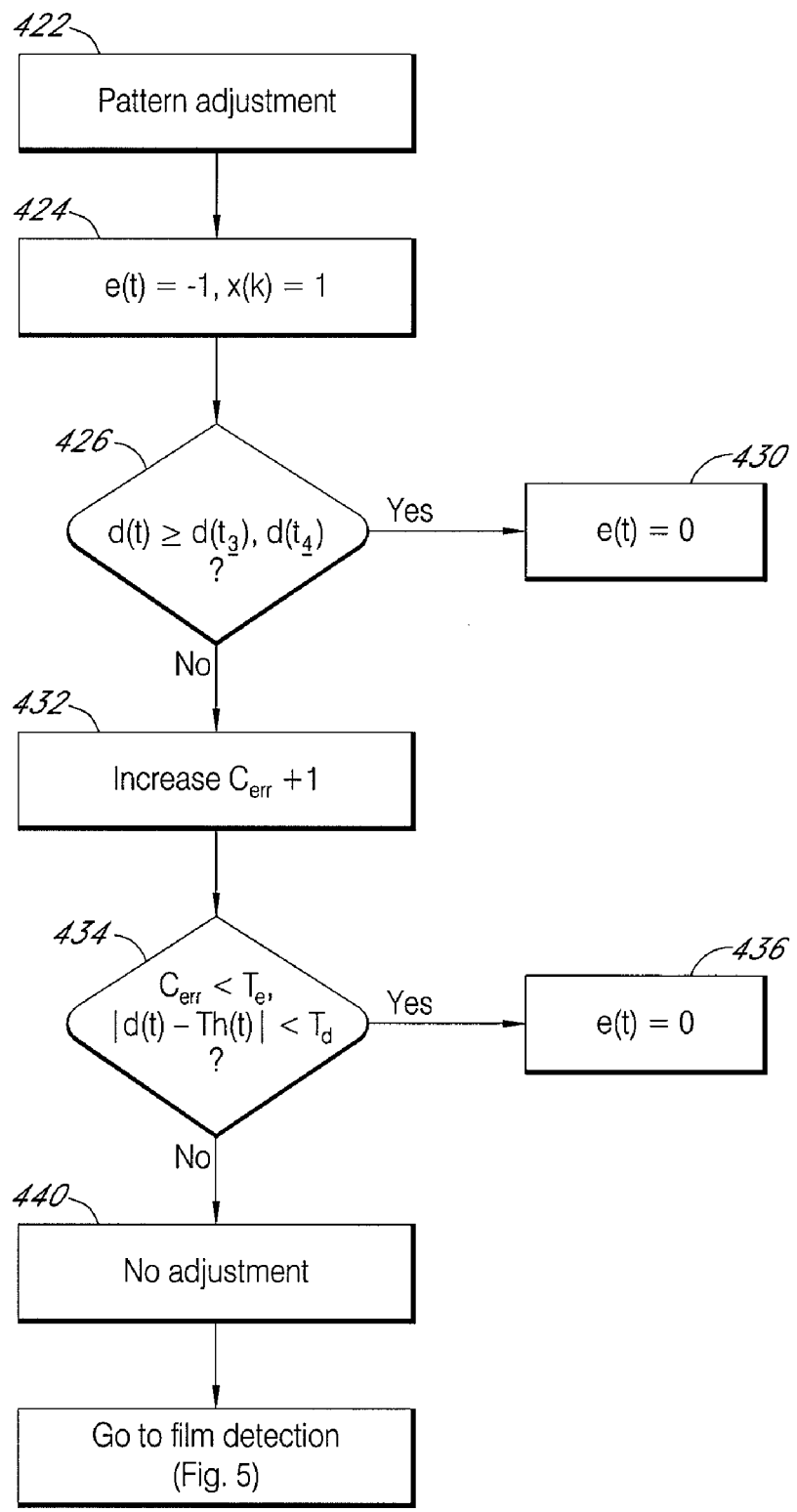

In an alternative embodiment, the method 400 determines in Step 402 that e(t) is not equal to 1 and x(t) is not equal to −1 and moves to a second pattern adjustment method 422 (FIG. 4B). Since 1 and −1 are the only options for x(t) and e(t), when the x(t) and e(t) are different and do not satisfy the criteria of Step 402, the only remaining option is that e(t)=−1 and x(t)=1 (Step 424).

In Step 426, the pattern adjustment method 422 searches for $t_3$ which provides the expected pattern value, "−1" in this example, which is closest to the measured pattern value on x(t)'s right hand side, and $t_4$ which provides the expected pattern value, "−1" in this example, which is closest to the measured pattern value on x(t)'s left hand side. If d(t) is greater than both $d(t_3)$ and $d(t_4)$, then it is determined that there is a false detection of e(t) and the pattern value e(t) is adjusted to 0 in Step 430, rather than being adjusted to be equal to x(t). Otherwise, the error counter, $C_{err}$, is increased by 1 in Step 432 while maintaining the pattern value unchanged. The remaining method Steps 434 through 440 are conducted in accordance with the corresponding steps 414-420 of method 400.

The generated pattern may also be adjusted in the case where less motion is detected. In one embodiment, less motion may be detected by computing a mean (m) and standard deviation (s) of $D_t$=d(t−n+1), d(t−n+2), . . . d(t). If the value of m is less than a selected threshold $T_m$ and s is less than a selected threshold $T_s$, respectively, then the current frame is determined to have less motion.

In the case where less motion is detected, the pattern is set to zero by taking e(t)=0 for any t. By doing so, during the film mode detection process, described below, the film mode decision will be based upon the determination of the previous frame. Thus, if the previous frame is detected to be a known progressive film mode, then the current frame is also determined to be film. If the previous frame is detected as video, not a known progressive film mode, then the current frame will be detected as video as well.

Advantageously, the introduction of 0's into the pattern allows the method to reflect uncertainty in the pattern generation. As discussed in greater detail below regarding the film mode detection algorithm, 0 pattern values can be used to allow for differing levels of scrutiny in making a determination regarding the film mode, providing greater flexibility in the determination.

Upon generating the pattern, as described above, the generated pattern is subsequently analyzed using a film detection method 500. The film detection method 500 determines whether the generated pattern is film or video and, if film, what type of film. In general, a preliminary film detection decision is made by comparing the generated pattern to a plurality of known film patterns. For example, for n=11, the progressive film 22 mode has possible patterns of:

$Y_0$=[1, −1, 1, −1, 1, −1, 1, −1, 1, −1, 1] (Film position $P_0$=F22_A0)

$Y_1$=[−1, 1, −1, 1, −1, 1, −1, 1, −1, 1, −1] (Film position $P_1$=F22_A1)

while progressive film 32 mode has possible patterns of:

$Y_2$=[1, −1, −1, 1, −1, 1, −1, −1, 1, −1, 1] (Film position $P_2$=F32_A2)

$Y_3$=[−1, −1, 1, −1, 1, −1, −1, 1, −1, 1, −1] (Film position $P_3$=F32_A3)

$Y_4$=[1, 1, −1, 1, −1, −1, 1, −1, 1, −1, −1] (Film position $P_4$=F32_A4)

$Y_5$=[1, −1, 1, −1, −1, 1, −1, 1, −1, −1, 1] (Film position $P_5$=F32_A5)

$Y_6$=[−1, 1, −1, −1, 1, −1, 1, −1, −1, 1, −1] (Film position $P_6$=F32_A6)

In general, either a strict comparison or a loose comparison may be used in comparing the known and generated patterns. The decision as to which comparison to use is made based upon whether the frame previous to the current frame is detected to be a known progressive film mode or not. If the patterns match, as discussed in greater detail below, then the film mode is preliminarily determined to be a specific, known progressive film mode. Otherwise, the film mode is preliminarily determined to be video. Subsequently, the preliminary decision is subject to a reliability analysis which confirms or adjusts the preliminary result to provide a final result.

Figure 5:
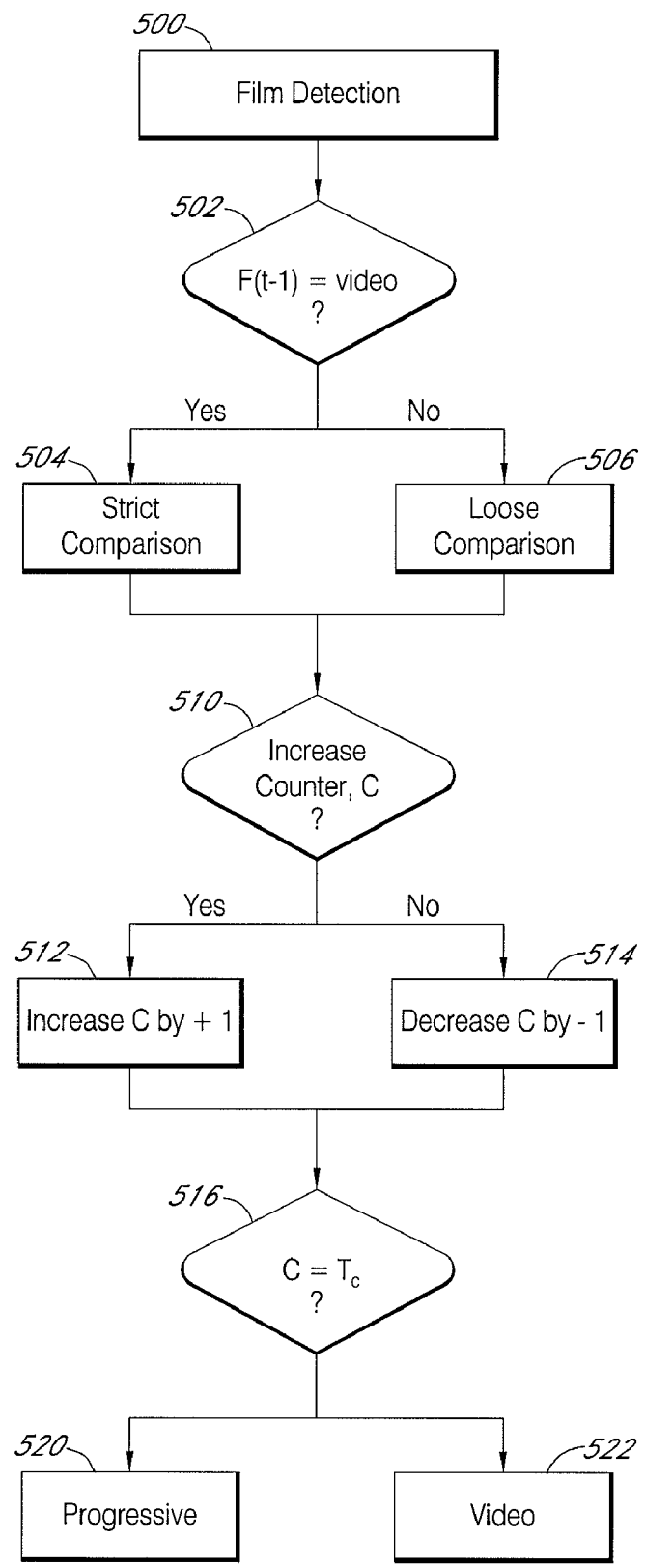
FIG. 5 illustrates one embodiment of a method of film mode detection using the patterns generated in the method of FIGS. 4A-4B.

FIG. 5 illustrates one embodiment of the film detection method 500. In step 502, the film detection method 500 determines which comparison, strict or loose, to use in making the preliminary film detection decision. If the frame prior to the current frame, F(t−1), has not been detected as a known progressive film mode, or if F(t−1) is determined to be film and follows a video frame, the method 500 goes to Step 504, where the strict comparison is performed. If the frame F(t−1) is detected as a known progressive film mode and follows a frame detected as a known progressive film mode, the method proceeds to Step 506 where the loose comparison is performed. In one embodiment, the film detection method 500 queries the memory component to make this determination.

In the strict comparison of Step 504, the generated pattern is compared to each of the possible patterns $Y_i$, such as those illustrated above. If the generated pattern is equal to a known pattern for each position in the known progressive pattern, the film position of the sequence of frames used to generate the pattern is set to that of the matched, known progressive film mode. In this scheme, generated pattern values of 0 are not considered a match with the known pattern values. Alternatively, if the generated pattern does not match any of the known patterns, the position of frames used to generate the pattern are designated as video.

In the loose comparison of Step 506, the generated pattern is also compared to each of the possible patterns $Y_i$. In this case, however, if the generated pattern matches each position in a known progressive pattern, with any positions in the generated pattern having a 0 being considered a match, the film position of the frames used to generate the pattern are set to match the progressive film position expected to come after previously detected progressive film position. Alternatively, if the generated pattern does not match any of the known progressive patterns, the position of frames used to generate the pattern are designated as video.

Advantageously, this system of loose and strict comparisons allows the threshold for pattern recognition to be changed, depending on the level of confidence present in whether or not the current frame is detected as a known progressive film mode. In the loose case, the prior frame has been determined to be a known progressive film mode and there is an expectation that the current frame is a known progressive film mode. Thus, the generated pattern is preliminarily recognized as a known progressive film mode if either the pattern values of a known pattern and the generated pattern match or if 0 values are present in the generated pattern where the two patterns do not match. Thus, patterns which have uncertain pattern positions, as represented by the 0 values, and are examined by loose comparison are not rejected as being part of a known progressive film mode sequence.

In contrast, however, if the prior frame is not determined to be part of a known progressive film mode, there is no expectation that the current frame is part of a known progressive film mode. Thus, a generated pattern with 0 values in it would not be considered to be film because of the uncertainty in the pattern value represented in the 0. As a result, a determination of a known progressive film mode is not made unless the film detection method 500 is very certain of the match.

In order to increase the reliability of the preliminary decision, after the preliminary decision is made in Steps 504 and 506, a final decision making process begins in Step 510. In this final decision making process, a counter C is adjusted upwards or downwards, depending on the results of the strict and loose comparisons in Steps 504 and 506. The counter is increased in Step 512 if (a) the previous frame F(t−1) is detected as video and the current frame F(t) is detected as a progressive film mode under strict comparison, or (b) frames F(t−1) and F(t) are both detected as progressive film modes and the position of F(t) is that expected based upon the film mode detected in frame F(t−1). Otherwise, the counter is reduced by 1 (Step 514). Subsequently, in Step 516, the current value of the counter is compared to a selected threshold value, $T_c$. If C is equal to $T_c$, then the preliminary decision is finalized (Step 520). If C is not equal to $T_c$, then the preliminary decision is set to video (Step 522).

So configured, the film detection method 500 provides a very high threshold for determining that the current frame is part of a known progressive film mode. Cumulatively, as frames are initially considered, even if they are preliminarily determined to be part of a known progressive film mode, they will be designated as video by the final decision making process, as C is less than $T_c$. As the number of frames determined preliminarily to be part of a known progressive film mode increases, the confidence in the determination that the frames are part of a known progressive film mode is increased, as embodied in the rise in C. Eventually, if the succession of frames is indeed part of a known progressive film mode, the counter will rise until C=$T_c$ and the final decision will determine that the frames are part of a known progressive film mode.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A method of detecting a film mode of a video sequence, comprising:
    computing a difference, d(t), between a selected frame, F(t), and a temporally adjacent frame, F(t−1), where t is time, over a selected range of times;
    calculating a difference threshold, T(t), for each d(t) as the average of the maximum and minimum values of d(t−1), d(t), and d(t+1) over the selected range of times;
    generating a pattern by assigning a pattern value, e(t), to each d(t), wherein a first pattern value is generated when d(t) is greater than T(t), a second pattern value different than the first is generated when d(t) is less than T(t), and e(t) is adjusted to a third pattern value if either:
    the frame F(t−1) has been determined to be part of a known progressive film mode and the generated pattern values, e(t), for any t within the selected range differ from an expected pattern value, x(t), determined from the known progressive film mode; or
    the standard deviation and mean of d(t), over the selected time range, are less than a threshold standard deviation, $T_s$, and a threshold mean, $T_m$, respectively; and
    determining the selected frames, F(t), over the selected range of times, to be either a part of a known progressive film mode or video based upon a comparison of the generated pattern to patterns of a plurality of known progressive film modes.

2. The method of claim 1, wherein the d(t) comprises an intensity difference between F(t) and F(t−1).

3. The method of claim 2, wherein d(t) is calculated using the sum of absolute differences in intensity between F(t) and F(t−1).

4. The method of claim 1, wherein F(t) and F(t−1) are sub-sampled and d(t) is calculated using the sum of absolute differences in intensity between F(t) and F(t−1).

5. The method of claim 1, wherein the selected frames, F(t), are determined to be part of a known progressive film mode if each pattern value in the generated pattern follows one of the known progressive film mode patterns.

6. The method of claim 1, wherein the selected frames, F(t), are determined to be part of a selected progressive film mode if each e(t) in the generated pattern not equal to the third pattern value follows the pattern of the selected progressive film mode.

7. A method of detecting a film mode of a plurality of frames of a video sequence, comprising:
computing a difference, d(t), between a selected frame, F(t), and a temporally adjacent frame, F(t−1), where t is time, over a selected range of times;
generating a pattern value, e(t), for each frame, comprising a first pattern value and a second pattern value, different than the first, using the measured differences; and
adjusting one or more of the pattern values to a third value, different than the first and second pattern values, if either:
the frame F(t−1) has been determined to be part of a known progressive film mode and the generated pattern values, e(t), for any t within the selected range differ from an expected pattern value, x(t), determined from the known progressive film mode; or
the standard deviation and mean of d(t), over the selected time range, are less than a threshold standard deviation, $T_s$, and a threshold mean, $T_m$, respectively;
wherein, if F(t−1) is not detected to be part of a known progressive film mode, the film mode of F(t) is determined to be a progressive film mode if each pattern value in the generated pattern follows the pattern of the known progressive film mode and wherein if F(t−1) is detected to be part of a known progressive film mode, the film mode of F(t) is determined to be the known progressive film mode if each e(t) in the generated pattern not equal to the third pattern value follows the pattern of the known progressive film mode.

8. The method of claim 1, wherein the difference is calculated using an intensity difference between F(t) and F(t−1).

9. The method of claim 8, wherein the difference is calculated using the sum of absolute differences in intensity between F(t) and F(t−1).

10. The method of claim 7, wherein F(t) and F(t−1) are sub-sampled and difference is calculated using the sum of absolute differences in the intensity between F(t) and F(t−1).

11. The method of claim 7, wherein generating the pattern comprises:
comparing d(t) to a threshold difference, T(t), where t is time and d(t) is the difference between frames F(t) and F(t−1); and
assigning the generated pattern value, e(t), for each d(t), wherein a first pattern value is generated when d(t) is greater than T(t) and a second pattern value different than the first is generated when d(t) is less than T(t).

12. The method of claim 11, wherein the threshold difference comprises the average of the maximum and minimum values of d(t−1), d(t), and d(t+1).

13. An apparatus for detecting progressive video sequences from a video sequence of unknown film mode, comprising:
a first component which computes a difference, d(t), between a selected frame, F(t), and a temporally adjacent frame, F(t−1), where t is time, over a selected range of times;
a second component, coupled to the first component, which calculates a difference threshold, T(t), for each d(t) as the average of the maximum and minimum values of d(t−1), d(t), and d(t+1) and generates a pattern value, e(t), for each d(t), wherein a first pattern value is generated when d(t) is greater than T(t) and a second pattern value different than the first is generated when d(t) is less than T(t) and e(t) is adjusted to a third pattern value if either:
the frame F(t−1) has been determined to be part of a known film mode and the generated pattern values, e(t), for any t within the selected range differ from an expected pattern value, x(t), determined from the known film mode; or
the standard deviation and mean of d(t), over the selected time range, are less than a threshold standard deviation, $T_s$, and a threshold mean, $T_m$, respectively; and
a third component, coupled to the first component, which determines that the selected frames, F(t), over the selected range of times, to be either part of a selected progressive film mode or video based upon a comparison of the generated pattern to patterns of a plurality of known progressive film modes.

14. The apparatus of claim 13, wherein the first component measures an intensity difference between F(t) and F(t−1).

15. The apparatus of claim 14, wherein the first component measures an intensity difference between F(t) and F(t−1) by a sum of absolute differences calculation.

16. The apparatus of claim 13, wherein the first component sub-samples F(t) and F(t−1) and measures an intensity difference between the sub-sampled F(t) and F(t−1).

17. The apparatus of claim 13, wherein the generated pattern is compared to a progressive 3:2 film mode.

18. The apparatus of claim 13, wherein the selected frames, F(t), are determined to be part of a known progressive film mode if each pattern value in the generated pattern follows one of the known progressive patterns.

19. The apparatus of claim 13, wherein the selected frames, F(t), are determined to be part of a selected progressive film mode if each e(t) in the generated pattern not equal to the third pattern value follows the pattern of the selected progressive film mode.

20. The apparatus of claim 13, wherein frames detected to be a part of known progressive film mode are passed along unchanged to a decoder and wherein frames detected to be video are further processed to recover their source film signal.

* * * * *